United States Patent
Chen

(10) Patent No.: US 10,173,181 B2
(45) Date of Patent: Jan. 8, 2019

(54) QUICK DECANTER

(71) Applicant: World Link Article Enterprise Co., Ltd., Kaohsiung (TW)

(72) Inventor: Hsing-Hui Chen, Kaohsiung (TW)

(73) Assignee: World Link Article Enterprise Co., Ltd., Kaohsiung (TW)

(*) Notice: Subject to any disclaimer, the term of this patent is extended or adjusted under 35 U.S.C. 154(b) by 161 days.

(21) Appl. No.: 15/440,001

(22) Filed: Feb. 23, 2017

(65) Prior Publication Data

US 2018/0236415 A1 Aug. 23, 2018

(51) Int. Cl.
*B01F 5/06* (2006.01)
*B01F 3/04* (2006.01)
*C12G 1/00* (2006.01)

(52) U.S. Cl.
CPC ........ *B01F 3/04787* (2013.01); *B01F 5/0606* (2013.01); *C12G 1/00* (2013.01); *B01F 2003/04872* (2013.01); *B01F 2215/0072* (2013.01)

(58) Field of Classification Search
CPC ................ B01F 3/04787; B01F 5/0606; B01F 2003/04872; B01F 2215/0072; C12G 1/00
USPC ............................................ 261/75, 108, 110
See application file for complete search history.

(56) References Cited

U.S. PATENT DOCUMENTS

| 2,704,206 A * | 3/1955 | Crook .................. A01C 23/042 137/575 |
| 6,568,660 B1 * | 5/2003 | Flanbaum .............. B65D 47/06 222/189.07 |
| 2016/0175782 A1 * | 6/2016 | Lau ........................ B01F 5/0428 261/76 |
| 2017/0158483 A1 * | 6/2017 | Gatipon ............... B67D 1/0048 |
| 2017/0259221 A1 * | 9/2017 | Min .................... B01F 3/04787 |

FOREIGN PATENT DOCUMENTS

WO WO 2010/029442 A2 * 3/2010

* cited by examiner

*Primary Examiner* — Charles S Bushey
(74) *Attorney, Agent, or Firm* — Alan D. Kamrath; Kamrath IP Lawfirm, P.A.

(57) ABSTRACT

A decanter includes a first body and a second body mounted on the first body. The first body is provided with a bottle insert, a curved wine channel and a wine outlet. The curved wine channel has an opening and is provided with a plurality of stepped portions. The second body covers and closes the first body, and a mixing cavity is defined between the second body and the curved wine channel. The second body is provided with a plurality of stop plates. The stop plates and the stepped portions form a tortuous passage in the mixing cavity. In practice, when the wine in the wine bottle enters the mixing cavity, the wine hits and is stirred by the stepped portions and the stop plates to enhance the mixing effect of the wine and the air.

7 Claims, 5 Drawing Sheets

QUICK DECANTER

BACKGROUND OF THE INVENTION

1. Field of the Invention

The present invention relates to a decanter and, more particularly, to a quick decanter for a wine.

2. Description of the Related Art

The grape-based wine is usually sealed and stored during a long period of time, so that tannic acid and pigment contained in the wine are deposited in the wine bottle. Thus, the wine has a poor flavor when it is opened to cause a bitter sensation to the user when tasting the wine. Therefore, the wine is gradually poured into a goblet and is shaken slowly to remove the bitterness of the wine. Alternatively, the wine is poured into a decanter to perform a decanting process, so that the tannic acid contained in the wine is oxidized, so as to release the deep fragrance and savor of the wine. However, the conventional decanter has complicated decanting procedures, thereby wasting the time. In addition, the conventional decanter has a large volume and is not carried easily and conveniently. Further, the conventional decanter is not washed and cleaned easily and quickly. Further, the wine and the air do not contact completely in the conventional decanter, thereby decreasing the decanting effect.

BRIEF SUMMARY OF THE INVENTION

The primary objective of the present invention is to provide a quick decanter that largely shortens the time for decanting the wine.

In accordance with the present invention, there is provided a decanter comprising a first body and a second body mounted on the first body. The first body is provided with a bottle insert, a curved wine channel and a wine outlet. The curved wine channel of the first body has an opening. The curved wine channel of the first body is provided with a plurality of stepped portions. The second body has a shape corresponding to the opening of the first body. The second body covers and closes the opening of the first body, and a mixing cavity is defined between the second body and the curved wine channel of the first body. The second body has an inner face provided with a plurality of stop plates. The stop plates of the second body and the stepped portions of the first body form a tortuous passage in the mixing cavity. In practice, the bottle insert of the first body is inserted into a wine bottle, while wine in the wine bottle extends through the bottle insert of the first body, enters the mixing cavity, hits and is stirred by the stepped portions of the first body and the stop plates of the second body, to enhance a mixing effect of the wine and the air, and flows outward from the wine outlet of the first body.

Preferably, a sealing ring is mounted on the bottle insert of the first body.

Preferably, the second body is combined with the first body by a shaft portion.

Preferably, the second body is provided with a bottle mounting portion having an arcuate shape.

Preferably, the decanter further comprises a cover pivotally mounted on the second body and located adjacent to the wine outlet of the first body to movably cover the wine outlet of the first body.

Preferably, a strainer is mounted in an entrance of the bottle insert of the first body.

Preferably, an energy stone is placed in the mixing cavity.

According to the primary advantage of the present invention, the stop plates of the second body and the stepped portions of the first body form the tortuous passage with multiple hitting faces to agitate the wine exactly so that the wine contacts and mixes with the air quickly and completely, to increase the decanting effect, and to enhance the flavor of the wine.

According to another advantage of the present invention, the decanter has a fashion shape to enhance the aesthetic quality.

According to a further advantage of the present invention, the decanter is carried easily and conveniently.

According to a further advantage of the present invention, the decanter can be disassembled easily and quickly to facilitate the user washing the parts of the decanter.

According to a further advantage of the present invention, the decanter is attached to the wine bottle, thereby facilitating the user finding and using the decanter.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
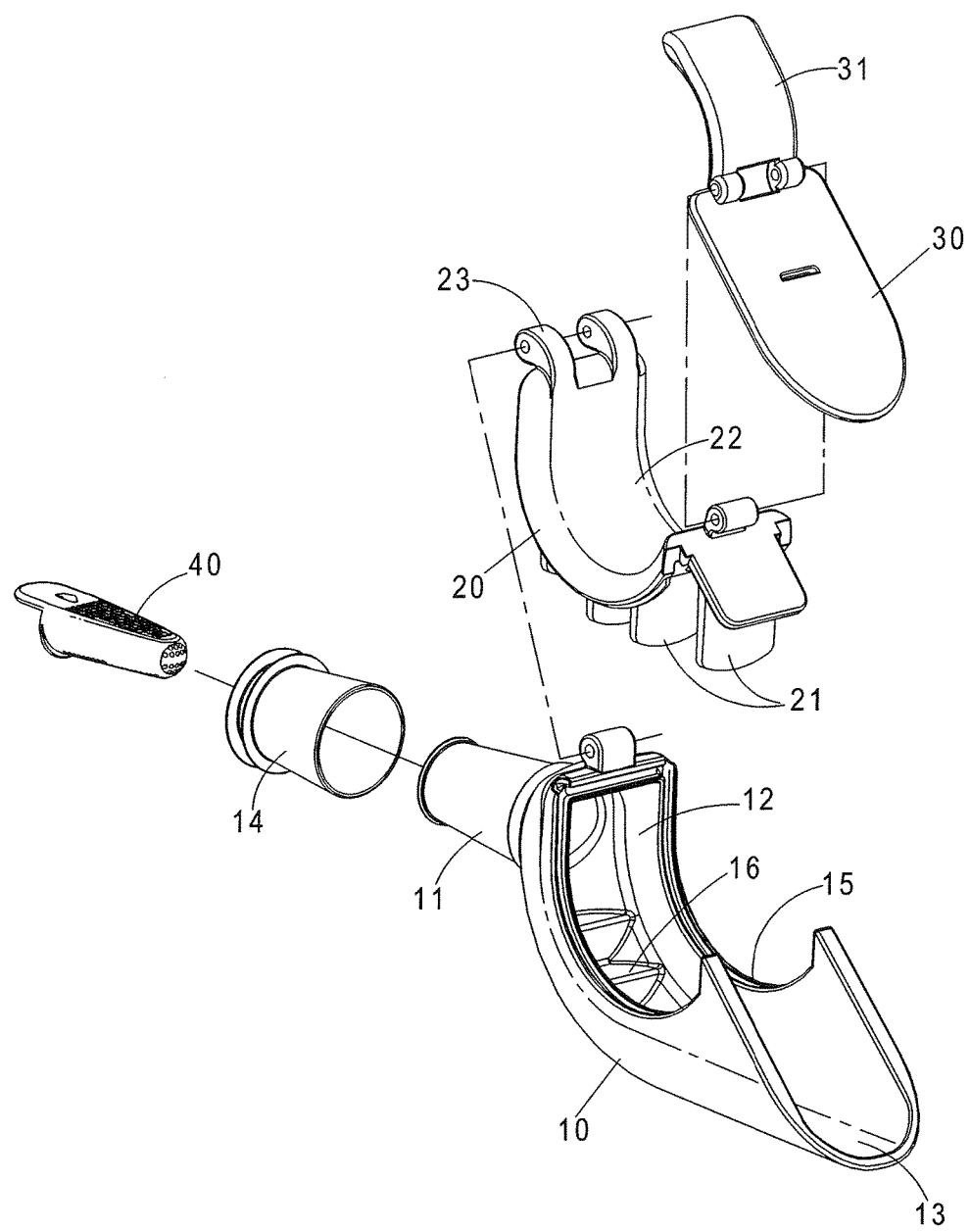
FIG. 1 is an exploded perspective view of a decanter in accordance with the preferred embodiment of the present invention.
Figure 2:
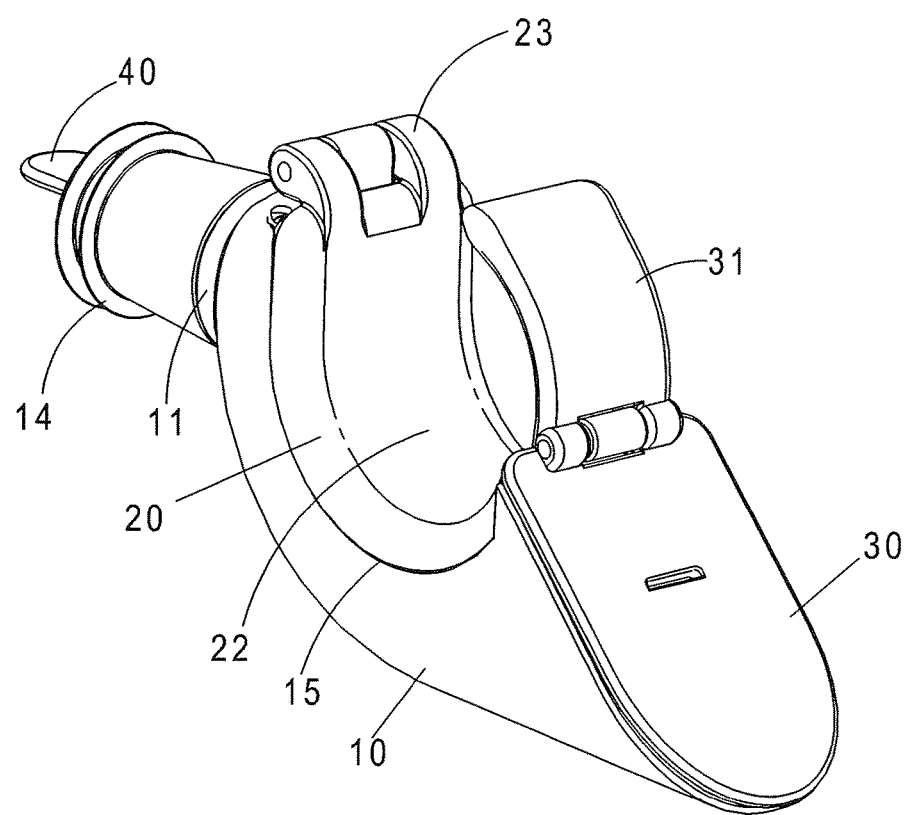
FIG. 2 is a perspective assembly view of the decanter in accordance with the preferred embodiment of the present invention.
Figure 3:
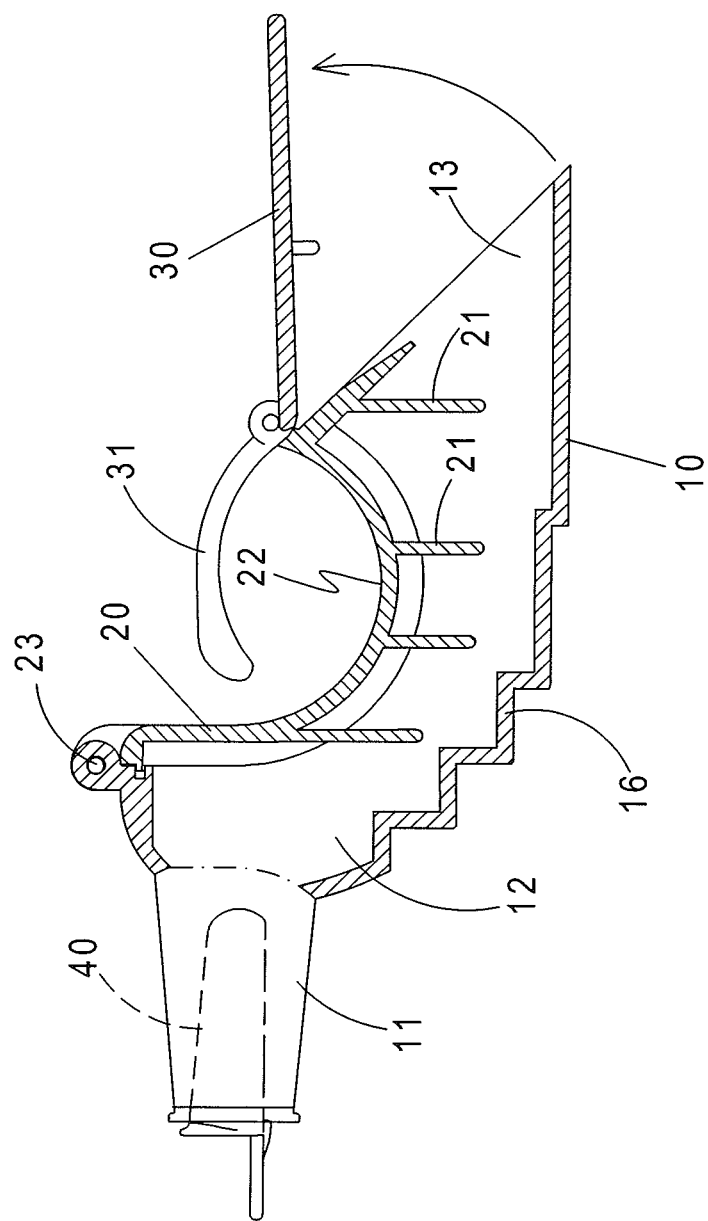
FIG. 3 is a cross-sectional view of the decanter in accordance with the preferred embodiment of the present invention.

Referring to the drawings and initially to FIGS. 1-3, a decanter in accordance with the preferred embodiment of the present invention comprises a first body 10 and a second body 20 mounted on the first body 10.

The first body 10 is provided with a bottle insert 11, a curved wine channel 12 and a wine outlet 13. The curved wine channel 12 of the first body 10 has an opening 15. The curved wine channel 12 of the first body 10 is provided with a plurality of stepped portions 16. When in use, a liquid, such as wine or the like, in turn extends through the bottle insert 11, the curved wine channel 12 and the wine outlet 13, and flows outward from the wine outlet 13 of the first body 10.

The second body 20 has a shape corresponding to the opening 15 of the first body 10. The second body 20 covers and closes the opening 15 of the first body 10, and a mixing cavity 17 is defined between the second body 20 and the curved wine channel 12 of the first body 10. The second body 20 has an inner face provided with a plurality of stop plates 21. The stop plates 21 of the second body 20 and the stepped portions 16 of the first body 10 form a tortuous passage in the mixing cavity 17.

In practice, when the bottle insert 11 of the first body 10 is inserted into a wine bottle 60 (see FIG. 5), the wine in the wine bottle 60 extends through the bottle insert 11 of the first body 10, then enters the mixing cavity 17 between the second body 20 and the curved wine channel 12 of the first body 10, then hits and is stirred by the stepped portions 16 of the first body 10 and the stop plates 21 of the second body 20, to enhance the mixing effect of the wine and the air, and finally flows outward from the wine outlet 13 of the first body 10.

In the preferred embodiment of the present invention, a sealing ring 14 is mounted on the bottle insert 11 of the first body 10, and a strainer 40 is mounted in an entrance of the bottle insert 11 of the first body 10. Preferably, the sealing ring 14 is made of silicone to provide a leakproof effect. The strainer 40 filters dregs in the wine.

In the preferred embodiment of the present invention, the second body 20 is combined with the first body 10 by a shaft portion 23.

In the preferred embodiment of the present invention, the second body 20 is provided with a bottle mounting portion 22 having an arcuate shape.

In the preferred embodiment of the present invention, the decanter further comprises a cover 30 pivotally mounted on the second body 20 and located adjacent to the wine outlet 13 of the first body 10 to movably cover the wine outlet 13 of the first body 10. The cover 30 is provided with a drive piece 31 extending outward therefrom. The drive piece 31 of the cover 30 and the bottle mounting portion 22 of the second body 20 form a substantially circular profile as shown in FIG. 2.

As shown in FIG. 3, when the second body 20 is combined with the first body 10, the second body 20 covers and closes the opening 15 of the first body 10, to define the mixing cavity 17 between the second body 20 and the curved wine channel 12 of the first body 10. At this time, the stop plates 21 of the second body 20 and the stepped portions 16 of the first body 10 form the tortuous passage which forms multiple hitting faces in the mixing cavity 17.

Figure 4:
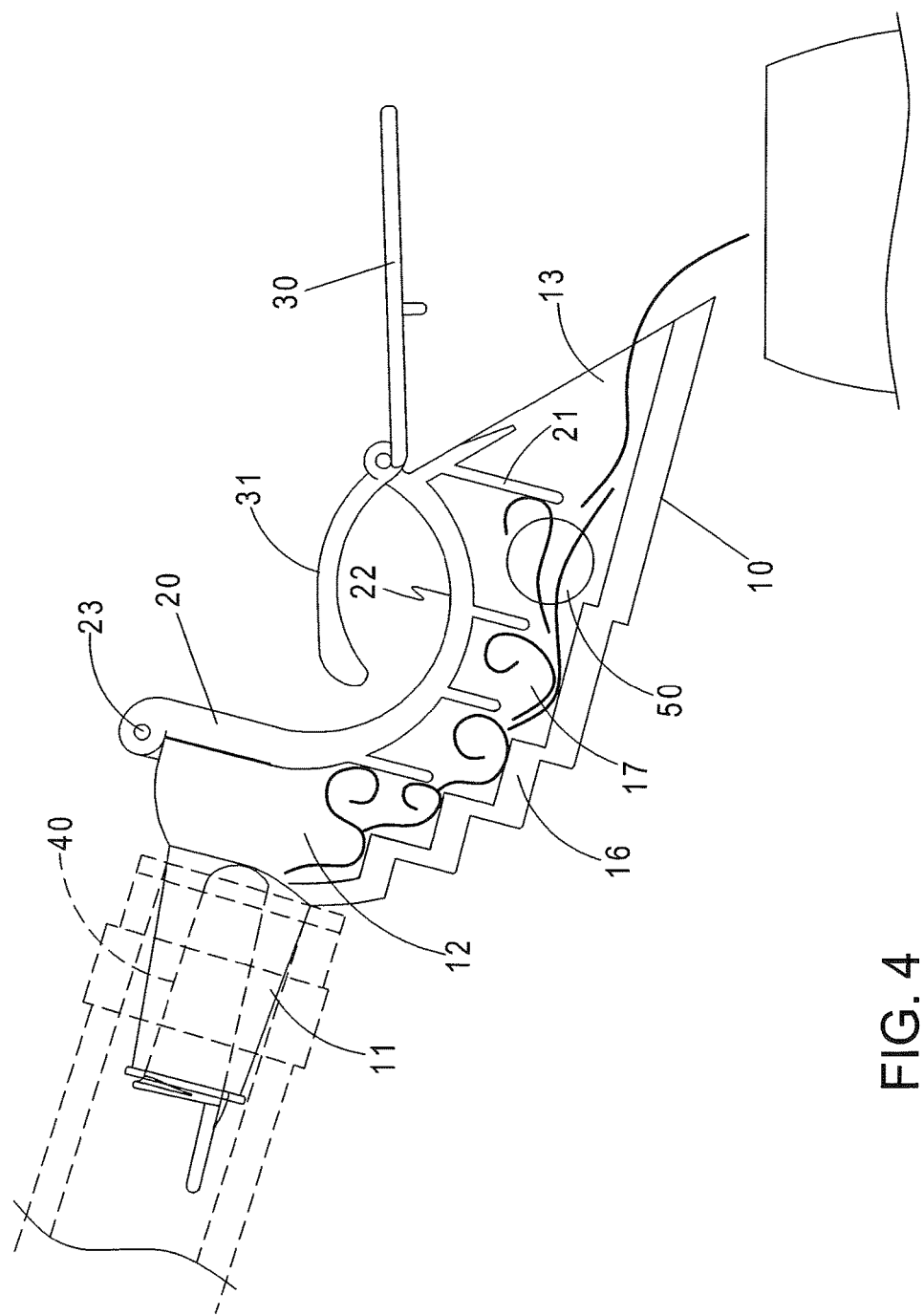
FIG. 4 is a schematic operational view of the decanter in accordance with the preferred embodiment of the present invention.

In operation, referring to FIG. 4 with reference to FIGS. 1-3, after the bottle insert 11 of the first body 10 is inserted into the wine bottle 60, the wine in the wine bottle 60 initially passes through the strainer 40, then extends through the bottle insert 11 of the first body 10, then enters the mixing cavity 17 between the second body 20 and the curved wine channel 12 of the first body 10, and finally flows outward from the wine outlet 13 of the first body 10 into a cup. In such a manner, the stop plates 21 of the second body 20 and the stepped portions 16 of the first body 10 form the tortuous passage with multiple hitting faces in the mixing cavity 17, so that when the wine flows in the mixing cavity 17, the wine is agitated and rolled in the mixing cavity 17, to greatly enhance the mixing effect of the wine and the air, and finally flows outward from the wine outlet 13 of the first body 10, such that the wine contacts with the air largely and is oxidated exactly. Thus, the wine is decanted quickly, thereby facilitating the user savoring the wine.

In the preferred embodiment of the present invention, an energy stone 50 is placed in the mixing cavity 17. The energy stone 50 is a natural mineral stone which has functions of a magnetic field, far infrared rays and negative ions, to activate the wine, so as to enhance the quality of the wine.

Figure 5:
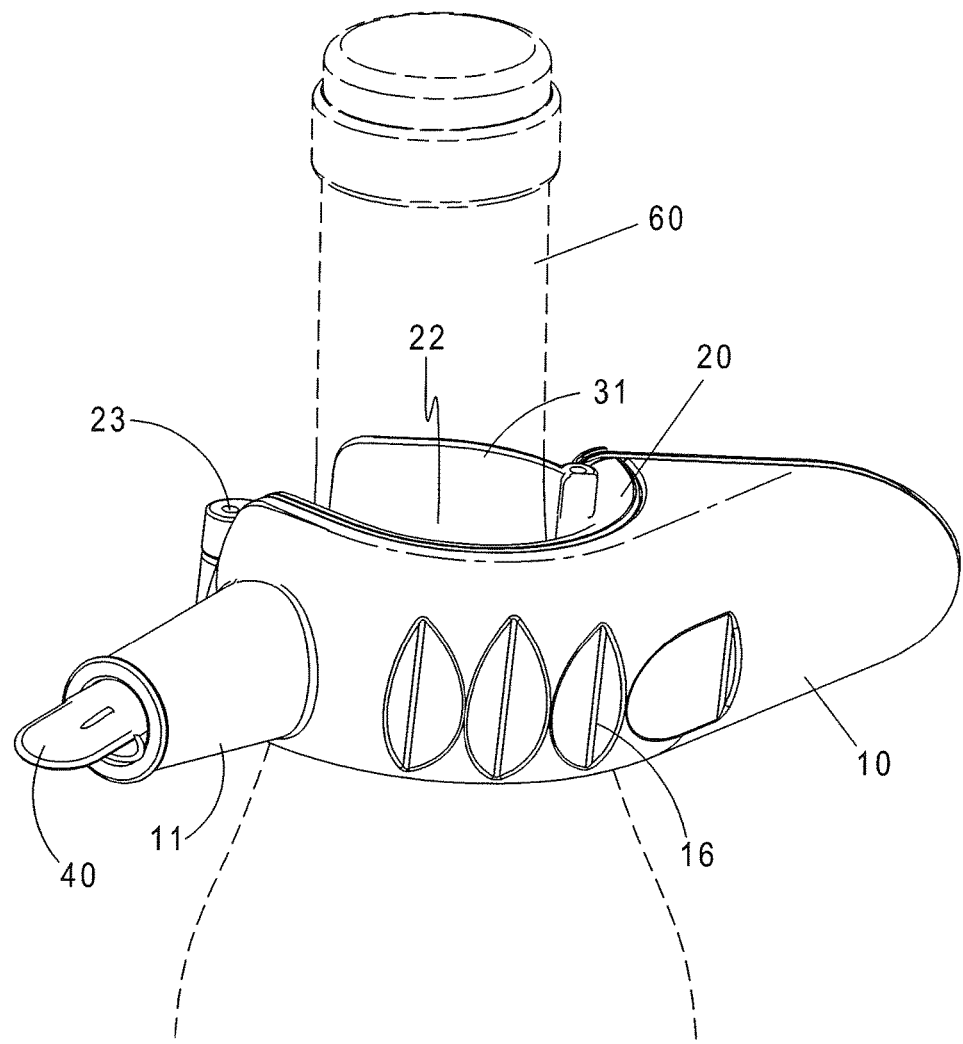
FIG. 5 is a schematic perspective view showing storage of the decanter in accordance with the preferred embodiment of the present invention.

Referring to FIG. 5 with reference to FIGS. 1-3, the bottle mounting portion 22 of the second body 20 is mounted on a neck of the wine bottle 60 to attach the decanter to the wine bottle 60, thereby facilitating the user finding and using the decanter.

Accordingly, the stop plates 21 of the second body 20 and the stepped portions 16 of the first body 10 form the tortuous passage with multiple hitting faces to agitate the wine exactly so that the wine contacts and mixes with the air quickly and completely, to increase the decanting effect, and to enhance the flavor of the wine. In addition, the decanter has a fashion shape to enhance the aesthetic quality. Further, the decanter is carried easily and conveniently. Further, the decanter can be disassembled easily and quickly to facilitate the user washing the parts of the decanter. Further, the decanter is attached to the wine bottle 60, thereby facilitating the user finding and using the decanter.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A decanter comprising:
a first body; and
a second body mounted on the first body;
wherein:
the first body is provided with a bottle insert, a curved wine channel and a wine outlet;
the curved wine channel of the first body has an opening;
the curved wine channel of the first body is provided with a plurality of stepped portions;
the second body has a shape corresponding to the opening of the first body;
the second body covers and closes the opening of the first body;
a mixing cavity is defined between the second body and the curved wine channel of the first body;
the second body has an inner face provided with a plurality of stop plates;
the stop plates of the second body and the stepped portions of the first body form a tortuous passage in the mixing cavity; and
the bottle insert of the first body is inserted into a wine bottle, while wine in the wine bottle extends through the bottle insert of the first body, enters the mixing cavity, hits and is stirred by the stepped portions of the first body and the stop plates of the second body, to enhance a mixing effect of the wine and the air, and flows outward from the wine outlet of the first body.

2. The decanter of claim 1, wherein a sealing ring is mounted on the bottle insert of the first body.

3. The decanter of claim 1, wherein the second body is combined with the first body by a shaft portion.

4. The decanter of claim 1, wherein the second body is provided with a bottle mounting portion having an arcuate shape.

5. The decanter of claim 1, further comprising:
a cover pivotally mounted on the second body and located adjacent to the wine outlet of the first body to movably cover the wine outlet of the first body.

6. The decanter of claim 1, wherein a strainer is mounted in an entrance of the bottle insert of the first body.

7. The decanter of claim 1, wherein an energy stone is placed in the mixing cavity.

* * * * *